(12) United States Patent
Biler et al.

(10) Patent No.: US 10,014,120 B2
(45) Date of Patent: *Jul. 3, 2018

(54) MANGANESE OXIDE CAPACITOR FOR USE IN EXTREME ENVIRONMENTS

(71) Applicant: AVX Corporation, Fountain Inn, SC (US)

(72) Inventors: Martin Biler, Lanskroun (CZ); Jan Petrzilek, Usti nad Orlici (CZ); Ivana Zednickova, Lanskroun (CZ)

(73) Assignee: AVX Corporation, Fountain Inn, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/362,005

(22) Filed: Nov. 28, 2016

(65) Prior Publication Data

US 2017/0084398 A1    Mar. 23, 2017

Related U.S. Application Data

(63) Continuation of application No. 14/611,600, filed on Feb. 2, 2015, now Pat. No. 9,508,492, which is a
(Continued)

(51) Int. Cl.
*H01G 9/15* (2006.01)
*H01G 9/10* (2006.01)
(Continued)

(52) U.S. Cl.
CPC .............. *H01G 9/10* (2013.01); *H01G 4/228* (2013.01); *H01G 9/0036* (2013.01);
(Continued)

(58) Field of Classification Search
None
See application file for complete search history.

(56) References Cited

U.S. PATENT DOCUMENTS 3,142,886 A    8/1964  Bronson et al.
3,345,545 A   10/1967  Bourgault et al.
(Continued)

FOREIGN PATENT DOCUMENTS

EP    1067989    1/2001
EP    1642359    4/2006
(Continued)

OTHER PUBLICATIONS

Abstract of Japanese Patent—JP2009231320, Oct. 8, 2009, 2 pages.
(Continued)

*Primary Examiner* — Dion R Ferguson
(74) *Attorney, Agent, or Firm* — Dority & Manning, P.A.

(57) ABSTRACT

A capacitor assembly for use in high voltage and high temperature environments is provided. More particularly, the capacitor assembly includes a capacitor element containing an anodically oxidized porous, sintered body that is coated with a manganese oxide solid electrolyte. To help facilitate the use of the capacitor assembly in high voltage (e.g., above about 35 volts) and high temperature (e.g., above about 175° C.) applications, the capacitor element is enclosed and hermetically sealed within a housing in the presence of a gaseous atmosphere that contains an inert gas. It is believed that the housing and inert gas atmosphere are capable of limiting the amount of moisture supplied to the manganese dioxide. In this manner, the solid electrolyte is less likely to undergo an adverse reaction under extreme conditions, thus increasing the thermal stability of the capacitor assembly. In addition to functioning well in both high voltage and high temperature environments, the capacitor assembly of the present invention may also exhibit a high volumetric efficiency.

17 Claims, 4 Drawing Sheets

Related U.S. Application Data continuation of application No. 13/313,367, filed on Dec. 7, 2011, now Pat. No. 8,947,857.

(60) Provisional application No. 61/472,871, filed on Apr. 7, 2011.

(51) Int. Cl.

| | | |
|---|---|---|
| *H01G 9/012* | (2006.01) | |
| *H01G 9/042* | (2006.01) | |
| *H01G 4/228* | (2006.01) | |
| *H01G 9/052* | (2006.01) | |
| *H01G 13/00* | (2013.01) | |
| *H01G 9/00* | (2006.01) | |
| *H01G 9/032* | (2006.01) | |
| *H01G 9/06* | (2006.01) | |
| H01G 9/08 | (2006.01) | |
| H01G 2/06 | (2006.01) | |
| H01G 9/04 | (2006.01) | |

(52) U.S. Cl.
CPC ............ *H01G 9/012* (2013.01); *H01G 9/032* (2013.01); *H01G 9/042* (2013.01); *H01G 9/0525* (2013.01); *H01G 9/06* (2013.01); *H01G 9/15* (2013.01); *H01G 13/003* (2013.01); *H01G 2/065* (2013.01); *H01G 9/08* (2013.01); *H01G 2009/05* (2013.01); *Y10T 29/417* (2015.01)

(56) References Cited

U.S. PATENT DOCUMENTS

| | | |
|---|---|---|
| 3,581,159 A | 5/1971 | Piper et al. |
| 3,922,773 A | 12/1975 | Marien et al. |
| 4,085,435 A | 4/1978 | Galvagni |
| 4,479,168 A | 10/1984 | Green, Jr. |
| 4,755,908 A | 7/1988 | Gardner |
| 4,910,645 A | 3/1990 | Jonas et al. |
| 4,945,452 A | 7/1990 | Sturmer et al. |
| 4,959,430 A | 9/1990 | Jonas et al. |
| 5,111,327 A | 5/1992 | Blohm et al. |
| 5,198,968 A | 3/1993 | Galvagni |
| 5,300,575 A | 4/1994 | Jonas et al. |
| 5,314,606 A | 5/1994 | Irie et al. |
| 5,357,399 A | 10/1994 | Salisbury |
| 5,394,295 A | 2/1995 | Galvagni et al. |
| 5,457,862 A | 10/1995 | Sakata et al. |
| 5,473,503 A | 12/1995 | Sakata et al. |
| 5,495,386 A | 2/1996 | Kulkarni |
| 5,586,000 A | 12/1996 | Sakata et al. |
| 5,608,261 A | 3/1997 | Bhattacharyya et al. |
| 5,638,253 A | 6/1997 | Hasegawa |
| 5,694,287 A | 12/1997 | Nishiyama et al. |
| 5,729,428 A | 3/1998 | Sakata et al. |
| 5,812,367 A | 9/1998 | Kudoh et al. |
| 5,949,639 A | 9/1999 | Maeda et al. |
| 5,951,840 A | 9/1999 | Fukaumi et al. |
| 6,052,273 A | 4/2000 | Inoue et al. |
| 6,191,936 B1 | 2/2001 | Webber et al. |
| 6,197,252 B1 | 3/2001 | Bishop et al. |
| 6,322,912 B1 | 11/2001 | Fife |
| 6,346,127 B1 | 2/2002 | Kuriyama |
| 6,369,239 B2 | 4/2002 | Rauchschwalbe et al. |
| 6,391,275 B1 | 5/2002 | Fife |
| 6,416,730 B1 | 7/2002 | Fife |
| 6,527,937 B2 | 3/2003 | Fife |
| 6,528,662 B2 | 3/2003 | Jonas |
| 6,576,099 B2 | 6/2003 | Kimmel et al. |
| 6,592,740 B2 | 7/2003 | Fife |
| 6,635,729 B1 | 10/2003 | Groenendaal et al. |
| 6,639,787 B2 | 10/2003 | Kimmel et al. |
| 6,674,635 B1 | 1/2004 | Fife et al. |
| 6,756,473 B2 | 6/2004 | Reuter et al. |
| 6,891,016 B2 | 5/2005 | Reuter et al. |
| 6,954,351 B2 | 10/2005 | Konuma et al. |
| 6,987,663 B2 | 1/2006 | Merker et al. |
| 6,995,972 B2 | 2/2006 | Fujii et al. |
| 7,092,242 B1 | 8/2006 | Gloss et al. |
| 7,102,016 B2 | 9/2006 | Reuter |
| 7,116,548 B2 | 10/2006 | Satterfield, Jr. et al. |
| 7,118,690 B2 | 10/2006 | Wessling et al. |
| 7,154,740 B2 | 12/2006 | Merker et al. |
| 7,220,397 B2 | 5/2007 | Kimmel et al. |
| 7,262,511 B2 | 8/2007 | Osako et al. |
| 7,279,015 B2 | 10/2007 | Merker |
| 7,304,832 B2 | 12/2007 | Ushio et al. |
| 7,312,979 B2 | 12/2007 | Ishizuka et al. |
| 7,341,705 B2 | 3/2008 | Schnitter |
| 7,341,801 B2 | 3/2008 | Reuter et al. |
| 7,358,326 B2 | 4/2008 | Heuer et al. |
| 7,377,947 B2 | 5/2008 | Merker et al. |
| 7,381,396 B2 | 6/2008 | Thomas et al. |
| 7,411,779 B2 | 8/2008 | Merker et al. |
| 7,419,926 B2 | 9/2008 | Schnitter et al. |
| 7,449,588 B2 | 11/2008 | Jonas et al. |
| 7,495,888 B2 | 2/2009 | Take |
| 7,515,396 B2 | 4/2009 | Biler |
| 7,554,793 B2 | 6/2009 | Chacko |
| 7,563,290 B2 | 7/2009 | Qiu et al. |
| 7,582,958 B2 | 9/2009 | Brailey |
| 7,585,983 B2 | 9/2009 | Reuter et al. |
| 7,688,571 B2 | 3/2010 | Ishizuka et al. |
| 7,697,265 B2 | 4/2010 | Umemoto et al. |
| 7,724,502 B2 | 5/2010 | Petrzilek et al. |
| 7,750,099 B2 | 7/2010 | Chikusa et al. |
| 7,785,493 B2 | 8/2010 | Jonas et al. |
| 7,867,291 B2 | 1/2011 | Petrzilek et al. |
| 8,075,640 B2 | 12/2011 | Marek et al. |
| 8,194,395 B2 | 6/2012 | Zednicek et al. |
| 8,279,584 B2 | 10/2012 | Zednickova |
| 8,300,387 B1 | 10/2012 | Zednickova et al. |
| 8,379,372 B2 | 2/2013 | Zednicek et al. |
| 8,416,558 B2 | 4/2013 | Kurokawa |
| 8,824,122 B2 | 9/2014 | Vilc et al. |
| 8,947,857 B2 | 2/2015 | Biler et al. |
| 2001/0012193 A1 | 8/2001 | Watanabe et al. |
| 2003/0105207 A1 | 6/2003 | Kleyer et al. |
| 2005/0065352 A1 | 3/2005 | Brassat et al. |
| 2005/0167789 A1 | 8/2005 | Zhuang |
| 2006/0035143 A1 | 2/2006 | Kida et al. |
| 2006/0180797 A1 | 8/2006 | Merker et al. |
| 2006/0260713 A1 | 11/2006 | Pyszczek et al. |
| 2007/0064376 A1 | 3/2007 | Merker et al. |
| 2008/0005878 A1 | 1/2008 | Merker et al. |
| 2009/0030149 A1 | 1/2009 | Morita et al. |
| 2009/0244812 A1 | 10/2009 | Rawal et al. |
| 2009/0310285 A1 | 12/2009 | Reuter et al. |
| 2009/0318710 A1 | 12/2009 | Brassat et al. |
| 2010/0085685 A1 | 4/2010 | Pinwill |
| 2010/0148124 A1 | 6/2010 | Reuter et al. |
| 2010/0234517 A1 | 9/2010 | Plantenberg et al. |
| 2010/0265634 A1 | 10/2010 | Freeman et al. |
| 2010/0302712 A1* | 12/2010 | Zednicek ............... H01G 9/012 361/525 |
| 2011/0085285 A1 | 4/2011 | Zednicek et al. |
| 2011/0157774 A1 | 6/2011 | Aitchison et al. |
| 2012/0257325 A1 | 10/2012 | Zednickova |
| 2014/0368974 A1 | 12/2014 | Vile et al. |

FOREIGN PATENT DOCUMENTS

| | | |
|---|---|---|
| GB | 1069685 | 8/1965 |
| JP | 3127813 | 5/1991 |
| JP | H03178116 | 8/1991 |
| JP | 2853376 | 2/1999 |
| JP | 11112157 | 4/1999 |
| JP | 2005039168 | 2/2005 |
| JP | 2005217129 | 8/2005 |
| JP | 2006231320 | 9/2006 |
| JP | 2006278875 | 10/2006 |
| WO | WO9736303 | 10/1997 |
| WO | WO2009030615 | 3/2009 |

(56) References Cited

FOREIGN PATENT DOCUMENTS

| WO | WO2009043648 | 4/2009 |
|----|--------------|--------|
| WO | WO2009047059 | 4/2009 |
| WO | WO2009135752 | 11/2009 |
| WO | WO2009141209 | 11/2009 |
| WO | WO2010003874 | 1/2010 |
| WO | WO2010015468 | 2/2010 |
| WO | WO2010089111 | 8/2010 |
| WO | WO2010102751 | 9/2010 |

OTHER PUBLICATIONS

Abstract of Japanese Patent No. JP 1140621 dated Jun. 1, 1989.
Abstract of Japanese Patent No. JP3109712 dated May 9, 1991.
Abstract of Japanese Patent No. JP3109713 dated May 9, 1991.
Abstract of Japanese Patent No. JP3109714 dated May 9, 1991.
Machine Translation of Japanese Patent No. 2005-039168 (Oct. 2, 2005), 17 pages.
Machine Translation of JP2005217129.
Machine Translation of JP2006278875.
Machine Translation of JP50-047159.
Machine Translation of JP55-120150.
Material Safety Data Sheet from Dow Corning Corporation on 736 Heat Resistant/Sealant, Mar. 2, 2011, 9 pages.
Paper—Freeman et al., "Electrical Characterization of Polymer Tantalum Capacitors with Poly(3, 4-Ethylenedioxythiophene) Cathode," Journal of the Electrochemical Society, vol. 156, No. 6, 2009, 10 pages.
Paper—Merker et al., "Conducting Polymer Dispersions for High-Capacitance Tantalum Capacitors,": CARTS Europe 2006, Sep. 2006, Bad Homburg, Germany, 6 pages.
Paper—Merker et al., "New Conducting Polymer Dispersions for Solid Electrolytic Capacitors," CARTS Europe 2005, Oct. 17-20, 2005, Prague, CZ Republic, 6 pages.
Paper—Merker et al., "Tuning Conducting Polymer Dispersions for High-CV Tantalum Capacitors." CARTS Europe Oct. 29-Nov. 1, 2007, Barcelona, Spain, 6 pages.
Paper—Simpson et al., "Advances and Applications of Inherently Conductive Polymer Technologies Based on Poly(3, 4-Ethylenedioxythiophene)," 2005 AIMCAL Fall Technical Conference and $19^{th}$ International Vacuum Web Coating Conference, Oct. 16-20, 2005, Session 5: Advances in Technology, Myrtle Beach, SC, 10 pages.
Paper—Young et al., "Performance and Reliability Study of High voltage Tantalum Polymer Capacitors," 2010 Electronic Components Association, Inc., Arlington, VA; CARTS 2010 Conference Proceedings, CARTS 2010 Conference, New Orleans, LA, Apr. 2010, 13 pages.
Presentation—Freeman et al., "Hermetically Sealed Polymer Tantalum Capacitors, " CMSE Europe 2010.
Product Information on Dow Corning® 736 Heat Resistant Sealant, 3 pages.
Product Information of Stycase™ 2651, General Purpose, Epoxy Encapsulant, from Emerson & Coming, Jan. 22, 2007, 3 pages.
Search Report for GB1204438.4 dated Jul. 16, 2012, 4 pages.

\* cited by examiner

MANGANESE OXIDE CAPACITOR FOR USE IN EXTREME ENVIRONMENTS

CROSS REFERENCE TO RELATED APPLICATIONS

The present application is a continuation of U.S. application Ser. No. 14/611,600, filed on Feb. 2, 2015, which is a continuation of U.S. application Ser. No. 13/313,367, filed on Dec. 7, 2011, which claims priority to U.S. Provisional Application Ser. No. 61/472,871 having a filing date of Apr. 7, 2011, which are incorporated herein by reference.

BACKGROUND OF THE INVENTION

Manganese dioxide is known and widely used as a solid electrolyte in electrolyte capacitors. Such capacitors are conventionally formed by first anodizing a valve-metal anode (e.g., tantalum) to form a dielectric oxide coating, and thereafter immersing the oxide-coated anode in an aqueous solution of manganese nitrate. After a sufficient period of time, the wet anode is heated to cause pyrolytic decomposition of the manganese nitrate to manganese dioxide. The capacitor element is also typically coated with graphite and silver layers, and then encapsulated with a resin. Unfortunately, one problem with conventional manganese oxide capacitors is that the encapsulating resin (e.g., epoxy resin) is often unstable in extreme environments, i.e., high temperature (e.g., above about 175° C.) and/or high voltage (e.g., above about 35 volts). Attempts to remove the resin, however, can adversely impact electrical performance by allowing moisture to contact the capacitor element.

As such, a need currently exists for a solid electrolytic capacitor having improved performance in high temperature and/or high voltage environments.

SUMMARY OF THE INVENTION

In accordance with one embodiment of the present invention, a capacitor assembly is disclosed that comprises a capacitor element comprising an anode formed from an anodically oxidized, sintered porous body and a solid electrolyte coating the anode. The solid electrolyte comprises a manganese oxide. The assembly also comprises a housing that defines an interior cavity within which the capacitor element is positioned, wherein the interior cavity has a gaseous atmosphere that contains an inert gas. An anode termination is in electrical connection with the anode body and a cathode termination that is in electrical connection with the solid electrolyte.

In accordance with another embodiment of the present invention, a method of forming a capacitor assembly is disclosed. The method comprises positioning a capacitor element within an interior cavity of a housing, wherein the capacitor element comprises an anodically oxidized, sintered anode body coated with a solid electrolyte. The solid electrolyte comprises a manganese oxide. The anode body is electrically connected to an anode termination and the solid electrolyte is electrically connected to a cathode termination. The capacitor element is hermetically sealed within the housing in the presence of a gaseous atmosphere that contains an inert gas.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
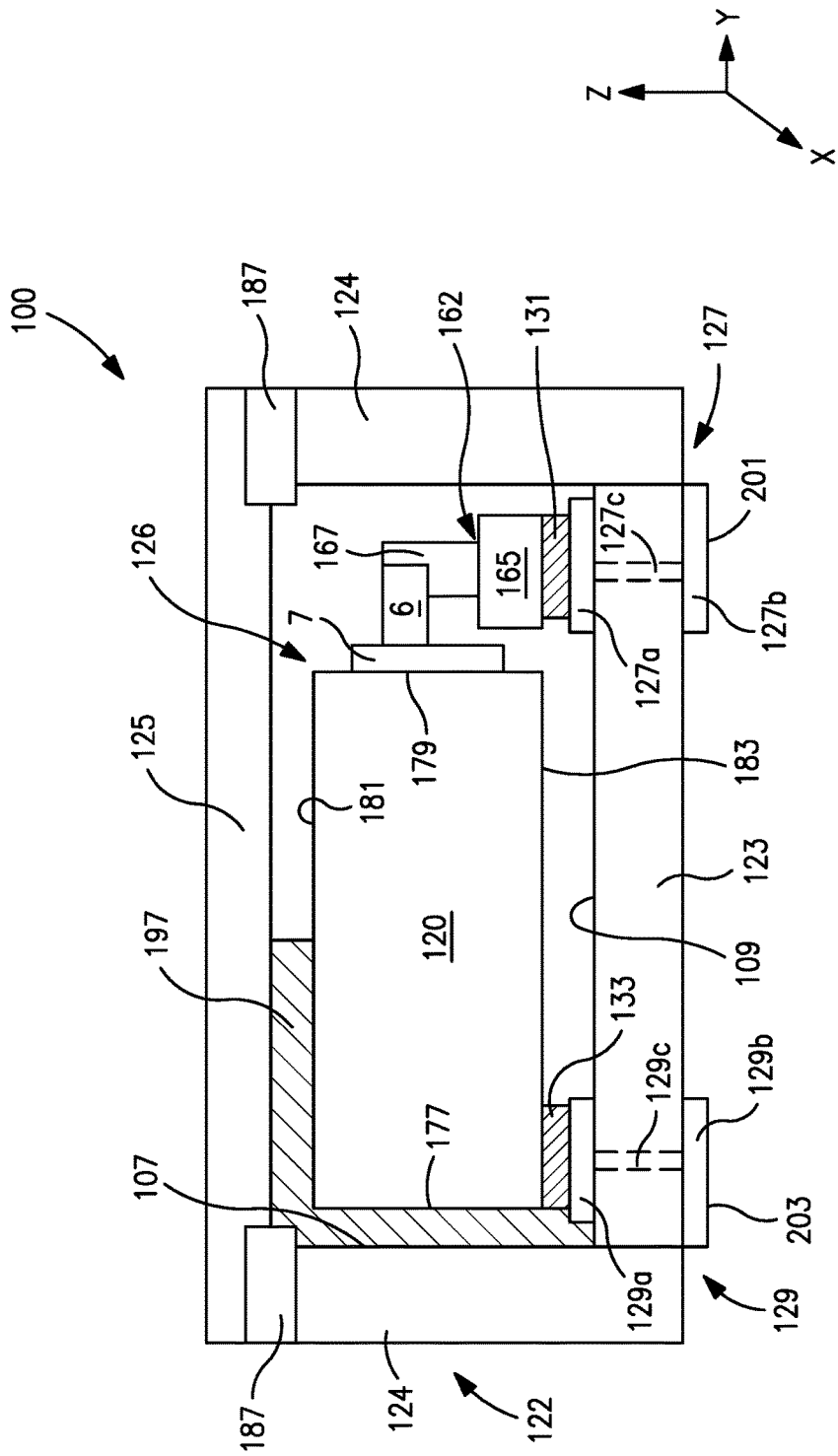
FIG. 1 is a cross-sectional view of one embodiment of a capacitor assembly of the assembly of the present invention.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a capacitor assembly for use in high voltage and high temperature environments. More particularly, the capacitor assembly includes a capacitor element containing an anodically oxidized porous, sintered body that is coated with a manganese oxide solid electrolyte. To help facilitate the use of the capacitor assembly in high voltage (e.g., above about 35 volts) and high temperature (e.g., above about 175° C.) applications, the capacitor element is enclosed and hermetically sealed within a housing in the presence of a gaseous atmosphere that contains an inert gas. It is believed that the housing and inert gas atmosphere are capable of limiting the amount of moisture supplied to the manganese dioxide. In this manner, the solid electrolyte is less likely to undergo an adverse reaction under extreme conditions, thus increasing the thermal stability of the capacitor assembly. In addition to functioning well in both high voltage and high temperature environments, the capacitor assembly of the present invention may also exhibit a high volumetric efficiency.

Various embodiments of the present invention will now be described in more detail.

I. Capacitor Element

A. Anode

For high voltage applications, it is often desired that the anode of the capacitor element is formed from a powder having a relatively low specific charge, such as less than about 70,000 microFarads*Volts per gram ("$\mu F*V/g$"), in some embodiments about 2,000 $\mu F*V/g$ to about 65,000 $\mu F*V/g$, and in some embodiments, from about 5,000 to about 50,000 $\mu F*V/g$. Of course, although powders of a low specific charge may sometimes be desired, it is by no means a requirement. Namely, the powder may also have a relatively high specific charge of about 70,000 microFarads*Volts per gram ("$\mu F*V/g$") or more, in some embodiments about 80,000 $\mu F*V/g$ or more, in some embodiments about 90,000 $\mu F*V/g$ or more, in some embodiments about 100,000 $\mu F*V/g$ or more, and in some embodiments, from about 120,000 to about 250,000 $\mu F*V/g$.

The powder may contain a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et at; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

The particles of the powder may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

Other components may be added to the powder to facilitate the construction of the anode body. For example, a binder and/or lubricant may be employed to ensure that the particles adequately adhere to each other when pressed to form the anode body. Suitable binders may include camphor, stearic and other soapy fatty acids, Carbowax (Union Carbide), Glyptal (General Electric), polyvinyl alcohols, naphthalene, vegetable wax, and microwaxes (purified paraffins). The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. After compaction, the resulting anode body may then be diced into any desired shape, such as square, rectangle, circle, oval, triangle, hexagon, octagon, heptagon, pentagon, etc. The anode body may also have a "fluted" shape in that it contains one or more furrows, grooves, depressions, or indentations to increase the surface to volume ratio to minimize ESR and extend the frequency response of the capacitance. The anode body may then be subjected to a heating step in which most, if not all, of any binder/lubricant are removed. For example, the anode body is typically heated by an oven that operates at a temperature of from about 150° C. to about 500° C. Alternatively, the binder/lubricant may also be removed by contacting the pellet with an aqueous solution, such as described in U.S. Pat. No. 6,197,252 to Bishop, et al.

Once formed, the anode body is then sintered. The temperature, atmosphere, and time of the sintering may depend on a variety of factors, such as the type of anode, the size of the anode, etc. Typically, sintering occurs at a temperature of from about from about 800° C. to about 1900° C., in some embodiments from about 1000° C. to about 1500° C., and in some embodiments, from about 1100° C. to about 1400° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

An anode lead may also be connected to the anode body that extends in a lateral direction therefrom. The anode lead may be in the form of a wire, sheet, etc., and may be formed from a valve metal compound, such as tantalum, niobium, niobium oxide, etc. Connection of the lead may be accomplished using known techniques, such as by welding the lead to the body or embedding it within the anode body during formation (e.g., prior to compaction and/or sintering).

The anode is also coated with a dielectric. The dielectric may be formed by anodically oxidizing ("anodizing") the sintered anode so that a dielectric layer is formed over and/or within the anode. For example, a tantalum (Ta) anode may be anodized to tantalum pentoxide ($Ta_2O_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

B. Manganese Oxide

As indicated above, the capacitor element also contains a manganese oxide (e.g., $MnO_2$) as a solid electrolyte. The manganese oxide may be formed through pyrolytic decomposition of a precursor (e.g., manganese nitrate ($Mn(NO_3)_2$)), such as described in U.S. Pat. No. 4,945,452 to Sturmer, et al., which is incorporated herein in its entirety by reference thereto for all purposes. For example, a dielectric-coated anode body may be contacted with a solution (e.g., dipped, immersed, sprayed, etc.) that contains the precursor and thereafter heated for conversion into the oxide. If desired, multiple application steps may be employed to achieve the desired thickness. In one embodiment, for example, the anode body is dipped into a first solution of a manganese oxide precursor, heated, and then into a second solution of manganese oxide precursor and heated. This process may be repeated until the desired thickness is reached.

While the constituents of the manganese oxide precursor solution(s) may vary in each application step, it is generally desired that at least one of the solutions contains a dispersant. In certain embodiments, the dispersant may be an organic compound containing a hydrophilic moiety and a hydrophobic moiety. The hydrophilic moiety may, for example, include a sulfonate, phosphonate, carboxylate, thiol, sulfonate ester, phosphite, phosphonite, phosphinite, phosphate, sulfate, phosphate ester, sulfoxide, sulfone, amino, etc., as well as mixtures and/or salts thereof. Unlike surfactants, the hydrophobic moiety of the dispersant is generally too small to substantially reduce the surface tension of the solution. For example, the hydrophobic moiety may be an aromatic or heteroatomic ring system having from 6 to 14 carbon atoms (substituted or unsubstituted), such as benzene, naphthalene, anthracene, toluene, xylene, pyridine, quinoline, isoquinoline, pyrazine, acridine, pyrimidine, pyridazine, etc.

Because the dispersant does not substantially lower the surface tension of the solution, it may have a surface tension that is approximately the same as water. For instance, the ratio of the surface tension of water (at 20° C.) to the surface tension of the dispersant (at a concentration of 1 wt. % in water and at 20° C.) may be from about 0.5 to about 2.0, in some embodiments from about 0.8 to about 1.2, and in some embodiments, from about 0.9 to about 1.1. In certain embodiments, the surface tension of the dispersant (at a concentration of 1 wt. % in water and at 20° C.) is from about 50 to about 95 dynes per centimeter, in some embodiments from about 55 to about 80 dynes per centimeter, and in some embodiments, from about 58 to about 68 dynes per centimeter. The surface tension of water is about 70 dynes per centimeter. To the contrary, conventional surfactants typically have a much lower surface tension. For example, Triton X-100 and Erkantol® NR are believed to both have a surface tension of approximately 30 dynes per centimeter (at a concentration of 1 wt. % in water at 20° C.). As is well known in the art, surface tension can be measured using commercially available force tensiometers or optical tensiometers (also known as contact angle meter or goniometer) in accordance with ISO 304 (1985), Cor 1:1998) and/or ASTM D 1331-89 (Method A).

In one particular embodiment, for example, the dispersant may contain an organic compound having the following structure, or a salt thereof:

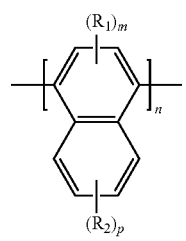

wherein, $R_1$ is an alkyl group having from 1 to 6 carbon atoms;

$R_2$ is a hydrophilic moiety, such as sulfonate, phosphonate, carboxylate, thiol, sulfonate ester, phosphite, phosphonite, phosphinite, phosphate, sulfate, phosphate ester, sulfoxide, sulfone, amino, etc., and combinations thereof;

m is from 0 to 8, in some embodiments from 0 to 4, and in one embodiment, 0;

p is from 1 to 8, in some embodiments from 1 to 4, and in one embodiment, 1; and n is from 1 to 100, and in some embodiments, from 2 to 30. It should be understood that the $R_1$ and $R_2$ groups may be bonded to one or more of the carbon atoms of the ring system. Also, if desired, the compound may be in the form of a salt in which the cation is an alkali metal (e.g., sodium, potassium, ammonium, etc.), alkaline metal (e.g., calcium), ammonia ($NH_4^+$), etc. Comparable compounds with a benzene nucleus also can be used.

The molecular weight of the dispersant may generally vary as desired, but is typically about 10,000 grams per mole or less, in some embodiments about 6,000 grams per mole or less, and in some embodiments, from about 2,000 to about 5,000 grams per mole. Suitable starting materials for forming such dispersants are well known in the art and may include, for instance, naphthalene-α-sulfonic acid (dihydrate), naphthalene-β-sulfonic acid (monohydrate), 2-methylnapthalene-6-sulfonic acid, etc. One particularly suitable dispersant that may be employed in the present invention is an alkali or alkaline metal salt of a condensed naphthalene sulfonic acid. Such compounds may be prepared as described in U.S. Pat. No. 3,067,243, the entirety of which is incorporated herein for all relevant purposes. For instance, the compound may be prepared by sulfonating naphthalene with sulfuric acid, condensing the sulfonated naphthalene with formaldehyde, and then neutralizing the condensate so obtained with a base (e.g., sodium hydroxide, potassium hydroxide, calcium hydroxide, etc.). The resulting salt of condensed naphthalene sulfonic acid may have the following structure:

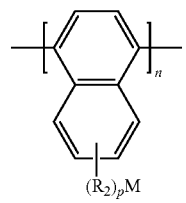

wherein, $R_2$ is $SO_3$;

p is an integer from 1 to 8;

n is from 1 to 100; and

M is sodium, potassium, or calcium. Particularly suitable sodium, potassium, or calcium salts of condensed naphthalene sulfonate are commercially available from Geo Specialty Chemicals under the trade name "DAXAD."

Rather than impacting surface tension, the dispersant helps "disperse" droplets that initially form when the manganese oxide precursor contacts the surface of the dielectric. Because these droplets become dispersed, the manganese oxide precursor is able to penetrate into very small spaces between the anode particles to increase the degree of surface coverage and improve the uniformity and consistency of the manganese oxide layer. Furthermore, the reduction in droplet formation also allows the coating to assume a film-like configuration that coats at least a portion of the anode in a substantially uniform manner. This improves the quality of the resulting oxide as well as its surface coverage, and thereby enhances the electrical performance of the capacitor.

To achieve the desired improvement in the impregnation of the manganese oxide precursor without adversely impacting other characteristics of the capacitor, it is generally desired that the concentration of the dispersant is selectively controlled within a certain range. For example, the solution into which the anode body is first dipped may contain the dispersant in an amount of from about 0.001 wt. % to about 5 wt. %, in some embodiments from about 0.005 wt. % to about 2 wt. %, and in some embodiments, from about 0.01 wt. % to about 1 wt. %. The precursor(s) (e.g., manganese nitrate) may likewise constitute from about 1 wt. % to about 55 wt. % in some embodiments from about 2 wt. % to about 15 wt. %, and in some embodiments, from about 5 wt. % to about 10 wt. %, of the solution.

A carrier, such as water, may also be employed in the solution. Aqueous solutions of the present invention may, for instance, contain water in an amount of from about 30 wt. % to about 95 wt. %, in some embodiments from about 40 wt. % to about 99 wt. % and in some embodiments, from about 50 wt. % to about 95 wt. %. In addition to the components noted above, the manganese nitrate solution may also contain other additives that improve the formation of the resulting oxide. In one embodiment, for example, an alcohol may be used to enhance the wettability of the dielectric with the solution. Suitable alcohols may include, for instance, methanol, ethanol, n-propanol, isopropanol, butanol, etc., as well as mixtures thereof. The concentration of the alcohol (s), when employed, may be from about 0.1 wt. % to about 50 wt. %, and in some embodiments, from about 0.5 wt. % to about 2 wt. %.

It should be understood that the actual amounts of the components in the solution may vary depending upon such factors as the particle size and distribution of particles in the anode, the temperature at which decomposition is performed, the identity of the dispersant, the identity of the carrier, the identity of the alcohol, etc. Furthermore, it should also be understood that differing concentrations may be employed in different application steps. For example, a first set of one or more dipping steps may be employed in which the manganese oxide precursor is present at a first concentration. Thereafter, a second set of one or more dipping steps may be employed in which the manganese oxide precursor is present at a second concentration. In some cases, the second concentration may be higher than the first concentration.

The amount of time in which the anode body is in contact with the manganese oxide precursor solution may vary as desired. For example, the anode body may be dipped into such a solution for a period of time ranging from about 10 seconds to about 10 minutes. The time may be the same or different for each individual dipping step. The dielectric-coated anode body may be at room temperature or pre-dried prior to contact with the precursor solution.

Regardless, once contacted with the precursor solution for the desired amount of time, the part is heated to a temperature sufficient to pyrolytically convert the precursor (e.g., manganese nitrate) to an oxide. Heating may occur, for instance, in a furnace at a temperature of from about 150° C. to about 300° C., in some embodiments from about 180° C. to about 290° C., and in some embodiments, from about 190° C. to about 260° C. Heating may be conducted in a moist or dry atmosphere. The time for the conversion depends on the furnace temperature, heat transfer rate and atmosphere, but generally is from about 3 to about 5 minutes. After pyrolysis, the leakage current may sometimes be high due to damage suffered by the dielectric film during the deposition of the manganese dioxide. To reduce this leakage, the capacitor may be reformed in an anodization bath as is known in the art. For example, the capacitor may be dipped into an electrolyte such as described above and then subjected to a DC current.

C. Other Components of the Capacitor

If desired, the capacitor may also contain other layers as is known in the art. For example, a protective coating may optionally be formed between the dielectric and solid electrolyte, such as one made of a relatively insulative resinous material (natural or synthetic). Such materials may have a specific resistivity of greater than about 10 Ω/cm, in some embodiments greater than about 100, in some embodiments greater than about 1,000 Ω/cm, in some embodiments greater than about $1\times10^5$ Ω/cm, and in some embodiments, greater than about $1\times10^{10}$ Ω/cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

If desired, the part may also be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

Generally speaking, the capacitor element is substantially free of resins that encapsulate the capacitor element as are often employed in conventional solid electrolytic capacitors. Among other things, the encapsulation of the capacitor element can lead to instability in extreme environments, i.e., high temperature (e.g., above about 175° C.) and/or high voltage (e.g., above about 35 volts).

II. Housing

As indicated above, the capacitor element is hermetically sealed within a housing. Hermetic sealing typically occurs in the presence of a gaseous atmosphere that contains at least one inert gas so as to inhibit oxidation of the solid electrolyte during use. The inert gas may include, for instance, nitrogen, helium, argon, xenon, neon, krypton, radon, and so forth, as well as mixtures thereof. Typically, inert gases constitute the majority of the atmosphere within the housing, such as from about 50 wt. % to 100 wt. %, in some embodiments from about 75 wt. % to 100 wt. %, and in some embodiments, from about 90 wt. % to about 99 wt. % of the atmosphere. If desired, a relatively small amount of non-inert gases may also be employed, such as carbon dioxide, oxygen, water vapor, etc. In such cases, however, the non-inert gases typically constitute 15 wt. % or less, in some embodiments 10 wt. % or less, in some embodiments about 5 wt. % or less, in some embodiments about 1 wt. % or less, and in some embodiments, from about 0.01 wt. % to about 1 wt. % of the atmosphere within the housing. For example, the moisture content (expressed in terms of relatively humidity) may be about 10% or less, in some embodiments about 5% or less, in some embodiments about 1% or less, and in some embodiments, from about 0.01 to about 5%.

Any of a variety of different materials may be used to form the housing, such as metals, plastics, ceramics, and so forth. In one embodiment, for example, the housing includes one or more layers of a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. In another embodiment, the housing may include one or more layers of a ceramic material, such as aluminum nitride, aluminum oxide, silicon oxide, magnesium oxide, calcium oxide, glass, etc., as well as combinations thereof.

The housing may have any desired shape, such as cylindrical, D-shaped, rectangular, triangular, prismatic, etc. Referring to FIG. 1, for example, one embodiment of a capacitor assembly 100 is shown that contains a housing 122 and a capacitor element 120. In this particular embodiment, the housing 122 is generally rectangular. Typically, the housing and the capacitor element have the same or similar shape so that the capacitor element can be readily accommodated within the interior cavity. In the illustrated embodiment, for example, both the capacitor element 120 and the housing 122 have a generally rectangular shape.

If desired, the capacitor assembly of the present invention may exhibit a relatively high volumetric efficiency. To facilitate such high efficiency, the capacitor element typically occupies a substantial portion of the volume of an interior cavity of the housing. For example, the capacitor element may occupy about 30 vol. % or more, in some embodiments about 50 vol. % or more, in some embodiments about 60 vol. % or more, in some embodiments about 70 vol. % or more, in some embodiments from about 80 vol. % to about 98 vol. %, and in some embodiments, from about 85 vol. % to 97 vol. % of the interior cavity of the housing. To this end, the difference between the dimensions of the capacitor element and those of the interior cavity defined by the housing are typically relatively small.

Referring to FIG. 1, for example, the capacitor element 120 may have a length (excluding the length of the anode lead 6) that is relatively similar to the length of an interior cavity 126 defined by the housing 122. For example, the ratio of the length of the anode to the length of the interior cavity ranges from about 0.40 to 1.00, in some embodiments from about 0.50 to about 0.99, in some embodiments from about 0.60 to about 0.99, and in some embodiments, from about 0.70 to about 0.98. The capacitor element 120 may have a length of from about 5 to about 10 millimeters, and the interior cavity 126 may have a length of from about 6 to about 15 millimeters. Similarly, the ratio of the height of the capacitor element 120 (in the −z direction) to the height of the interior cavity 126 may range from about 0.40 to 1.00, in some embodiments from about 0.50 to about 0.99, in some embodiments from about 0.60 to about 0.99, and in some embodiments, from about 0.70 to about 0.98. The ratio of the width of the capacitor element 120 (in the −x direction) to the width of the interior cavity 126 may also range from about 0.50 to 1.00, in some embodiments from about 0.60 to about 0.99, in some embodiments from about 0.70 to about 0.99, in some embodiments from about 0.80 to about 0.98, and in some embodiments, from about 0.85 to about 0.95. For example, the width of the capacitor element 120 may be from about 2 to about 7 millimeters and the width of the interior cavity 126 may be from about 3 to about 10 millimeters, and the height of the capacitor element 120 may be from about 0.5 to about 2 millimeters and the width of the interior cavity 126 may be from about 0.7 to about 6 millimeters.

Although by no means required, the capacitor element may be attached to the housing in such a manner that an anode termination and cathode termination are formed external to the housing for subsequent integration into a circuit. The particular configuration of the terminations may depend on the intended application. In one embodiment, for example, the capacitor assembly may be formed so that it is surface mountable, and yet still mechanically robust. For example, the anode lead may be electrically connected to external, surface mountable anode and cathode terminations (e.g., pads, sheets, plates, frames, etc.). Such terminations may extend through the housing to connect with the capacitor. The thickness or height of the terminations is generally selected to minimize the thickness of the capacitor assembly. For instance, the thickness of the terminations may range from about 0.05 to about 1 millimeter, in some embodiments from about 0.05 to about 0.5 millimeters, and from about 0.1 to about 0.2 millimeters. If desired, the surface of the terminations may be electroplated with nickel, silver, gold, tin, etc. as is known in the art to ensure that the final part is mountable to the circuit board. In one particular embodiment, the termination(s) are deposited with nickel and silver flashes, respectively, and the mounting surface is also plated with a tin solder layer. In another embodiment, the termination(s) are deposited with thin outer metal layers (e.g., gold) onto a base metal layer (e.g., copper alloy) to further increase conductivity.

In certain embodiments, connective members may be employed within the interior cavity of the housing to facilitate connection to the terminations in a mechanically stable manner. For example, referring again to FIG. 1, the capacitor assembly 100 may include a connection member 162 that is formed from a first portion 167 and a second portion 165. The connection member 162 may be formed from conductive materials similar to the external terminations. The first portion 167 and second portion 165 may be integral or separate pieces that are connected together, either directly or via an additional conductive element (e.g., metal). In the illustrated embodiment, the second portion 165 is provided in a plane that is generally parallel to a lateral direction in which the lead 6 extends (e.g., −y direction). The first portion 167 is "upstanding" in the sense that it is provided in a plane that is generally perpendicular the lateral direction in which the lead 6 extends. In this manner, the first portion

167 can limit movement of the lead 6 in the horizontal direction to enhance surface contact and mechanical stability during use. If desired, an insulative material 7 (e.g. Teflon™ washer) may be employed around the lead 6.

The first portion 167 may possess a mounting region (not shown) that is connected to the anode lead 6. The region may have a "U-shape" for further enhancing surface contact and mechanical stability of the lead 6. Connection of the region to the lead 6 may be accomplished using any of a variety of known techniques, such as welding, laser welding, conductive adhesives, etc. In one particular embodiment, for example, the region is laser welded to the anode lead 6. Regardless of the technique chosen, however, the first portion 167 can hold the anode lead 6 in substantial horizontal alignment to further enhance the dimensional stability of the capacitor assembly 100.

Referring again to FIG. 1, one embodiment of the present invention is shown in which the connective member 162 and capacitor element 120 are connected to the housing 122 through anode and cathode terminations 127 and 129, respectively. More specifically, the housing 122 of this embodiment includes an outer wall 123 and two opposing sidewalls 124 between which a cavity 126 is formed that includes the capacitor element 120. The outer wall 123 and sidewalls 124 may be formed from one or more layers of a metal, plastic, or ceramic material such as described above. In this particular embodiment, the anode termination 127 contains a first region 127a that is positioned within the housing 122 and electrically connected to the connection member 162 and a second region 127b that is positioned external to the housing 122 and provides a mounting surface 201. Likewise, the cathode termination 129 contains a first region 129a that is positioned within the housing 122 and electrically connected to the solid electrolyte of the capacitor element 120 and a second region 129b that is positioned external to the housing 122 and provides a mounting surface 203. It should be understood that the entire portion of such regions need not be positioned within or external to the housing.

In the illustrated embodiment, a conductive trace 127c extends in the outer wall 123 of the housing to connect the first region 127a and second region 127b. Similarly, a conductive trace 129c extends in the outer wall 123 of the housing to connect the first region 127a and second region 127b. The conductive traces and/or regions of the terminations may be separate or integral. In addition to extending through the outer wall of the housing, the traces may also be positioned at other locations, such as external to the outer wall. Of course, the present invention is by no means limited to the use of conductive traces for forming the desired terminations.

Regardless of the particular configuration employed, connection of the terminations 127 and 129 to the capacitor element 120 may be made using any known technique, such as welding, laser welding, conductive adhesives, etc. In one particular embodiment, for example, a conductive adhesive 131 is used to connect the second portion 165 of the connection member 162 to the anode termination 127. Likewise, a conductive adhesive 133 is used to connect the cathode of the capacitor element 120 to the cathode termination 129. The conductive adhesives may be formed from conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et at, which is incorporated herein in its entirety by reference thereto for all purposes.

Optionally, a polymeric restraint may also be disposed in contact with one or more surfaces of the capacitor element, such as the rear surface, front surface, upper surface, lower surface, side surface(s), or any combination thereof. The polymeric restraint can reduce the likelihood of delamination by the capacitor element from the housing. In this regard, the polymeric restraint may possesses a certain degree of strength that allows it to retain the capacitor element in a relatively fixed positioned even when it is subjected to vibrational forces, yet is not so strong that it cracks. For example, the restraint may possess a tensile strength of from about 1 to about 150 Megapascals ("MPa"), in some embodiments from about 2 to about 100 MPa, in some embodiments from about 10 to about 80 MPa, and in some embodiments, from about 20 to about 70 MPa, measured at a temperature of about 25° C. It is normally desired that the restraint is not electrically conductive.

Although any of a variety of materials may be employed that have the desired strength properties noted above, curable thermosetting resins have been found to be particularly suitable for use in the present invention. Examples of such resins include, for instance, epoxy resins, polyimides, melamine resins, urea-formaldehyde resins, polyurethanes, silicone polymers, phenolic resins, etc. In certain embodiments, for example, the restraint may employ one or more polyorganosiloxanes. Silicon-bonded organic groups used in these polymers may contain monovalent hydrocarbon and/or monovalent halogenated hydrocarbon groups. Such monovalent groups typically have from 1 to about 20 carbon atoms, preferably from 1 to 10 carbon atoms, and are exemplified by, but not limited to, alkyl (e.g., methyl, ethyl, propyl, pentyl, octyl, undecyl, and octadecyl); cycloalkyl (e.g., cyclohexyl); alkenyl (e.g., vinyl, allyl, butenyl, and hexenyl); aryl (e.g., phenyl, tolyl, xylyl, benzyl, and 2-phenylethyl); and halogenated hydrocarbon groups (e.g., 3,3,3-trifluoropropyl, 3-chloropropyl, and dichlorophenyl). Typically, at least 50%, and more preferably at least 80%, of the organic groups are methyl. Examples of such methylpolysiloxanes may include, for instance, polydimethylsiloxane ("PDMS"), polymethylhydrogensiloxane, etc. Still other suitable methyl polysiloxanes may include dimethyidiphenylpolysiloxane, dimethyl/methylphenylpolysiloxane, polymethylphenylsiloxane, methylphenyl/dimethylsiloxane, vinyldimethyl terminated polydimethylsiloxane, vinylmethyl/dimethylpolysiloxane, vinyldimethyl terminated vinylmethyl/dimethylpolysiloxane, divinylmethyl terminated polydimethylsiloxane, vinylphenylmethyl terminated polydimethylsiloxane, dimethylhydro terminated polydimethylsiloxane, methylhydro/dimethylpolysiloxane, methylhydro terminated methyloctylpolysiloxane, methylhydro/phenylmethyl polysiloxane, etc.

The organopolysiloxane may also contain one more pendant and/or terminal polar functional groups, such as hydroxyl, epoxy, carboxyl, amino, alkoxy, methacrylic, or mercapto groups, which impart some degree of hydrophilicity to the polymer. For example, the organopolysiloxane may contain at least one hydroxy group, and optionally an average of at least two silicon-bonded hydroxy groups (silanol groups) per molecule. Examples of such organopolysiloxanes include, for instance, dihydroxypolydimethylsiloxane, hydroxy-trimethylsiloxypolydimethylsiloxane, etc. Other examples of hydroxyl-modified organopolysiloxanes are described in U.S. Patent Application Publication No. 2003/0105207 to Klever, et al., which is incorporated herein in its entirety by reference thereto for all purposes. Alkoxy-modified organopolysiloxanes may also be employed, such as dimethoxypolydimethylsiloxane, methoxy-trimethylsiloxypolydimethylsiloxane, diethoxypolydimethylsiloxane, ethoxy-trimethylsiloxy-polydimethylsiloxane, etc. Still other suitable organopolysiloxanes are those modified with at least one amino functional group. Examples of such amino-functional polysiloxanes include, for instance, diamino-functional polydimethylsiloxanes. Various other suitable polar functional groups for organopolysiloxanes are also described in U.S. Patent Application Publication No. 2010/00234517 to Plantenberg, et al., which is incorporated herein in its entirety by reference thereto for all purposes.

Epoxy resins are also particularly suitable for use as the polymeric restraint. Examples of suitable epoxy resins include, for instance, glycidyl ether type epoxy resins, such as bisphenol A type epoxy resins, bisphenol F type epoxy resins, phenol novolac type epoxy resins, orthocresol novolac type epoxy resins, brominated epoxy resins and biphenyl type epoxy resins, cyclic aliphatic epoxy resins, glycidyl ester type epoxy resins, glycidylamine type epoxy resins, cresol novolac type epoxy resins, naphthalene type epoxy resins, phenol aralkyl type epoxy resins, cyclopentadiene type epoxy resins, heterocyclic epoxy resins, etc. Still other suitable conductive adhesive resins may also be described in U.S. Patent Application Publication No. 2006/0038304 to Osako, et al. and U.S. Pat. No. 7,554,793 to Chacko, which are incorporated herein in their entirety by reference thereto for all purposes.

If desired, curing agents may also be employed in the polymeric restraint to help promote curing. The curing agents typically constitute from about 0.1 to about 20 wt. % of the restraint. Exemplary curing agents include, for instance, amines, peroxides, anhydrides, phenol compounds, silanes, acid anhydride compounds and combinations thereof. Specific examples of suitable curing agents are dicyandiamide, 1-(2 cyanoethyl) 2-ethyl-4-methylimidazole, 1-benzyl 2-methylimidazole, ethyl cyano propyl imidazole, 2-methylimidazole, 2-phenylimidazole, 2-ethyl-4-methylimidazole, 2-undecylimidazole, 1-cyanoethyl-2-methylimidazole, 2,4-dicyano-6,2-methylimidazolyl-(1)-ethyl-s-triazine, and 2,4-dicyano-6,2-undecylimidazolyl-(1)-ethyl-s-triazine, imidazolium salts (such as 1-cyanoethyl-2-undecylimidazolium trimellitate, 2-methylimidazolium isocyanurate, 2-ethyl-4-methylimidazolium tetraphenylborate, and 2-ethyl-1,4-dimethylimidazolium tetraphenylborate, etc. Still other useful curing agents include phosphine compounds, such as tributylphosphine, triphenylphosphine, tris(dimethoxyphenyl)phosphine, tris(hydroxypropyl)phosphine, and tris(cyanoethyl)phosphine; phosphonium salts, such as tetraphenylphosphonium-tetraphenylborate, methyltributylphosphonium-tetraphenylborate, and methyltricyanoethylphosphonium tetraphenylborate); amines, such as 2,4,6-tris(dimethylaminomethyl)phenol, benzylmethylamine, tetramethylbutylguanidine, N-methylpiperazine, and 2-dimethylamino-1-pyrroline; ammonium salts, such as triethylammonium tetraphenylborate; diazabicyclo compounds, such as 1,5-diazabicyclo[5,4,0]-7-undecene, 1,5-diazabicyclo[4,3,0]-5-nonene, and 1,4-diazabicyclo[2,2,2]-octane; salts of diazabicyclo compounds such as tetraphenylborate, phenol salt, phenolnovolac salt, and 2-ethylhexanoic acid salt; and so forth.

Still other additives may also be employed, such as photoinitiators, viscosity modifiers, suspension aiding agents, pigments, stress reducing agents, coupling agents (e.g., silane coupling agents), nonconductive fillers (e.g., clay, silica, alumina, etc.), stabilizers, etc. Suitable photoinitiators may include, for instance, benzoin, benzoin methyl ether, benzoin ethyl ether, benzoin n-propyl ether, benzoin isobutyl ether, 2,2 dihydroxy-2-phenylacetophenone, 2,2-dimethoxy-2-phenylacetophenone 2,2-diethoxy-2-phenylacetophenone, 2,2-diethoxyacetophenone, benzophenone, 4,4-bisdialylaminobenzophenone, 4-dimethylaminobenzoic acid, alkyl 4-dimethylaminobenzoate, 2-ethylanthraquinone, xanthone, thioxanthone, 2-cholorothioxanthone, etc. When employed, such additives typically constitute from about 0.1 to about 20 wt. % of the total composition.

Referring again to FIG. 1, for instance, one embodiment is shown in which a single polymeric restraint 197 is disposed in contact with an upper surface 181 and rear surface 177 of the capacitor element 120. While a single restraint is shown in FIG. 1, it should be understood that separate restraints may be employed to accomplish the same function. In fact, more generally, any number of polymeric restraints may be employed to contact any desired surface of the capacitor element. When multiple restraints are employed, they may be in contact with each other or remain physically separated. For example, in one embodiment, a second polymeric restraint (not shown) may be employed that contacts the upper surface 181 and front surface 179 of the capacitor element 120. The first polymeric restraint 197 and the second polymeric restraint (not shown) may or may not be in contact with each other. In yet another embodiment, a polymeric restraint may also contact a lower surface 183 and/or side surface(s) of the capacitor element 120, either in conjunction with or in lieu of other surfaces.

Regardless of how it is applied, it is typically desired that the polymeric restraint is also in contact with at least one surface of the housing to help further mechanically stabilize the capacitor element against possible delamination. For example, the restraint may be in contact with an interior surface of one or more sidewall(s), outer wall, lid, etc. In FIG. 1, for example, the polymeric restraint 197 is in contact with an interior surface 107 of sidewall 124 and an interior surface 109 of outer wall 123. While in contact with the housing, it is nevertheless desired that at least a portion of the cavity defined by the housing remains unoccupied to allow for the inert gas to flow through the cavity and limit contact of the solid electrolyte with oxygen. For example, at least about 5% of the cavity volume typically remains unoccupied by the capacitor element and polymer restraint, and in some embodiments, from about 10% to about 50% of the cavity volume.

Once connected in the desired manner, the resulting package is hermetically sealed as described above. Referring again to FIG. 1, for instance, the housing 122 may also include a lid 125 that is placed on an upper surface of side walls 124 after the capacitor element 120 and the polymer restraint 197 are positioned within the housing 122. The lid 125 may be formed from a ceramic, metal (e.g., iron, copper, nickel, cobalt, etc., as well as alloys thereof), plastic, and so forth. If desired, a sealing member 187 may be disposed between the lid 125 and the side walls 124 to help provide a good seal. In one embodiment, for example, the sealing member may include a glass-to-metal seal, Kovar® ring (Goodfellow Camridge, Ltd.), etc. The height of the side walls 124 is generally such that the lid 125 does not contact any surface of the capacitor element 120 so that it is not contaminated. The polymeric restraint 197 may or may not contact the lid 125. When placed in the desired position, the lid 125 is hermetically sealed to the sidewalls 124 using known techniques, such as welding (e.g., resistance welding, laser welding, etc.), soldering, etc. Hermetic sealing generally occurs in the presence of inert gases as described above so that the resulting assembly is substantially free of reactive gases, such as oxygen or water vapor.

Figure 2:
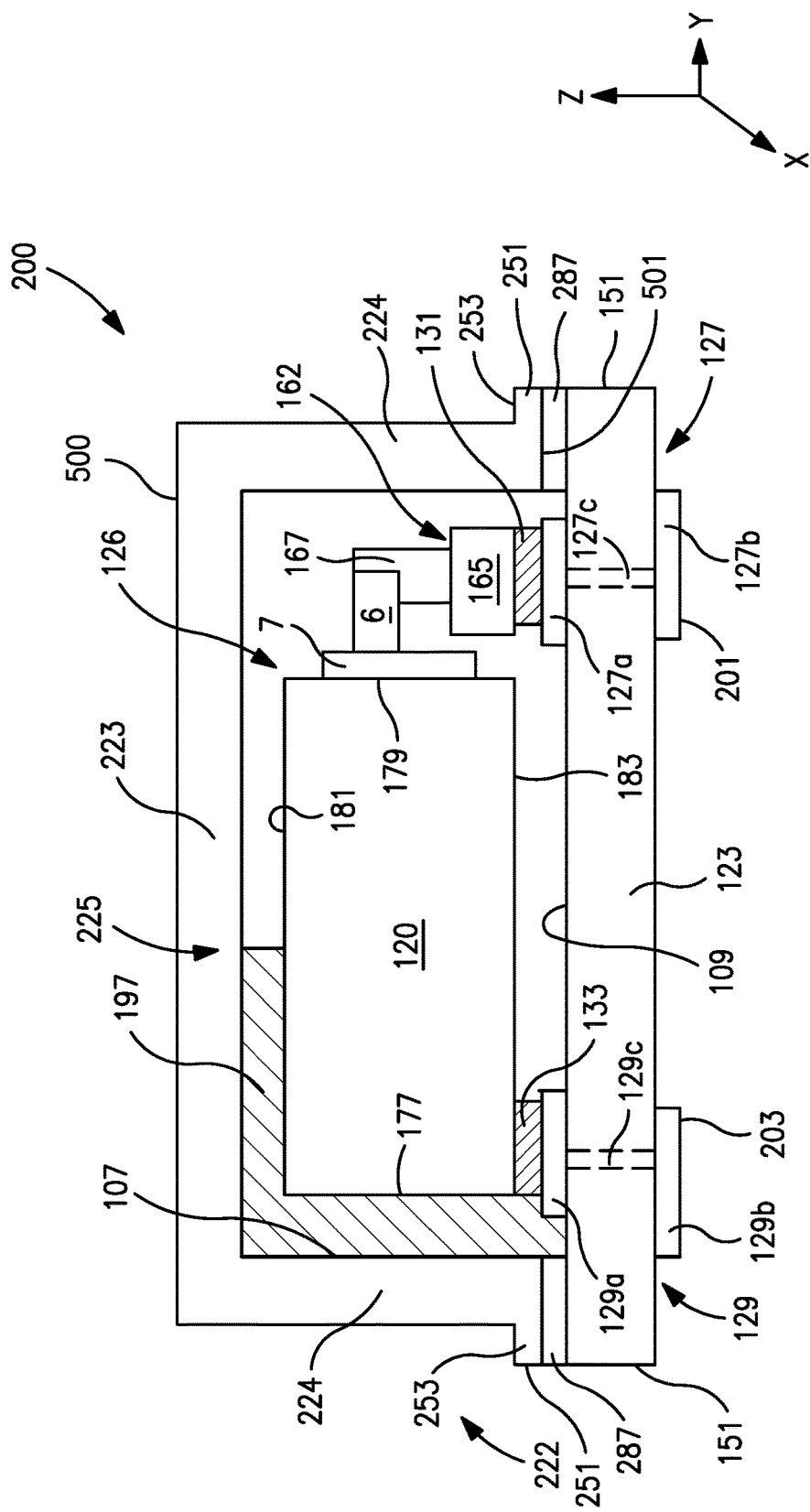
FIG. 2 is a cross-sectional view of another embodiment of a capacitor assembly of the assembly of the present invention.

It should be understood that the embodiments described are only exemplary, and that various other configurations may be employed in the present invention for hermetically sealing a capacitor element within a housing. Referring to FIG. 2, for instance, another embodiment of a capacitor assembly 200 is shown that employs a housing 222 that includes an outer wall 123 and a lid 225 between which a cavity 126 is formed that includes the capacitor element 120 and polymeric restraint 197. The lid 225 includes an outer wall 223 that is integral with at least one sidewall 224. In the illustrated embodiment, for example, two opposing sidewalls 224 are shown in cross-section. The outer walls 223 and 123 both extend in a lateral direction (−y direction) and are generally parallel with each other and to the lateral direction of the anode lead 6. The sidewall 224 extends from the outer wall 223 in a longitudinal direction that is generally perpendicular to the outer wall 123. A distal end 500 of the lid 225 is defined by the outer wall 223 and a proximal end 501 is defined by a lip 253 of the sidewall 224.

The lip 253 extends from the sidewall 224 in the lateral direction, which may be generally parallel to the lateral direction of the outer wall 123. The angle between the sidewall 224 and the lip 253 may vary, but is typically from about 60° to about 120°, in some embodiments from about 70° to about 110°, and in some embodiments, from about 80° to about 100° (e.g., about 90°). The lip 253 also defines a peripheral edge 251, which may be generally perpendicular to the lateral direction in which the lip 253 and outer wall 123 extend. The peripheral edge 251 is located beyond the outer periphery of the sidewall 224 and may be generally coplanar with an edge 151 of the outer wall 123. The lip 253 may be sealed to the outer wall 123 using any known technique, such as welding (e.g., resistance or laser), soldering, glue, etc. For example, in the illustrated embodiment, a sealing member 287 is employed (e.g., glass-to-metal seal, Kovar® ring, etc.) between the components to facilitate their attachment. Regardless, the use of a lip described above can enable a more stable connection between the components and improve the seal and mechanical stability of the capacitor assembly.

Figure 3:
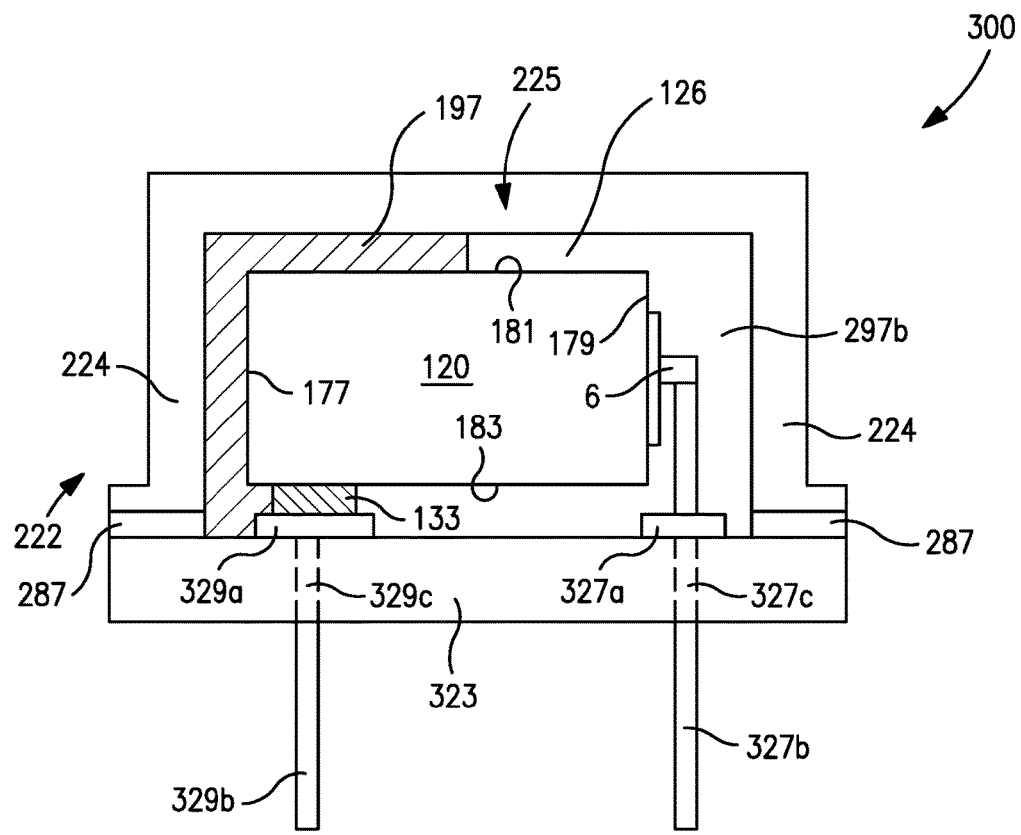
FIG. 3 is a cross-sectional view of yet another embodiment of a capacitor assembly of the assembly of the present invention.

Still other possible housing configurations may be employed in the present invention. For example, FIG. 3 shows a capacitor assembly 300 having a housing configuration similar to that of FIG. 2, except that terminal pins 327b and 329b are employed as the external terminations for the anode and cathode, respectively. More particularly, the terminal pin 327a extends through a trace 327c formed in the outer wall 323 and is connected to the anode lead 6 using known techniques (e.g., welding). An additional section 327a may be employed to secure the pin 327b. Likewise, the terminal pin 329b extends through a trace 329c formed in the outer wall 323 and is connected to the cathode via a conductive adhesive 133 as described above.

Figure 4:
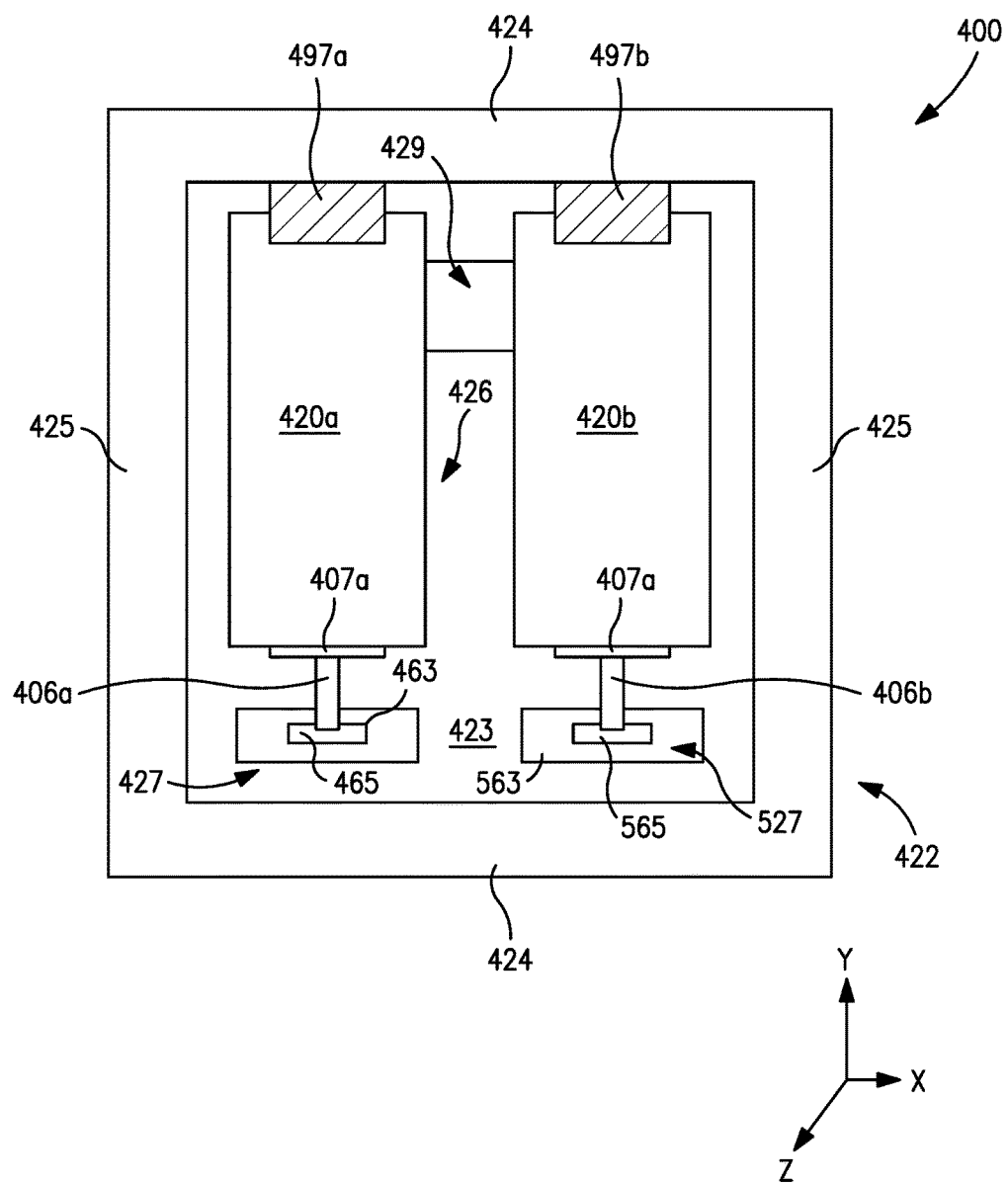
FIG. 4 is a top view of still another embodiment of a capacitor assembly of the assembly of the present invention.

The embodiments shown in FIGS. 1-3 are discussed herein in terms of only a single capacitor element. It should also be understood, however, that multiple capacitor elements may also be hermetically sealed within a housing. The multiple capacitor elements may be attached to the housing using any of a variety of different techniques. Referring to FIG. 4, for example one particular embodiment of a capacitor assembly 400 that contains two capacitor elements is shown and will now be described in more detail. More particularly, the capacitor assembly 400 includes a first capacitor element 420a in electrical communication with a second capacitor element 420b. In this embodiment, the capacitor elements are aligned so that their major surfaces are in a horizontal configuration. That is, a major surface of the capacitor element 420a defined by its width (−x direction) and length (−y direction) is positioned adjacent to a corresponding major surface of the capacitor element 420b. Thus, the major surfaces are generally coplanar. Alternatively, the capacitor elements may be arranged so that their major surfaces are not coplanar, but perpendicular to each other in a certain direction, such as the −z direction or the −x direction. Of course, the capacitor elements need not extend in the same direction.

The capacitor elements 420a and 420b are positioned within a housing 422 that contains an outer wall 423 and sidewalls 424 and 425 that together define a cavity 426. Although not shown, a lid may be employed that covers the upper surfaces of the sidewalls 424 and 425 and seals the assembly 400 as described above. Optionally, a polymeric restraint may also be employed to help limit the vibration of the capacitor elements. In FIG. 4, for example, separate polymer restraints 497a and 497b are positioned adjacent to and in contact with the capacitor elements 420a and 420b, respectively. The polymer restraints 497a and 497b may be positioned in a variety of different locations. Further, one of the restraints may be eliminated, or additional restraints may be employed. In certain embodiments, for example, it may be desired to employ a polymeric restraint between the capacitor elements to further improve mechanical stability.

In addition to the capacitor elements, the capacitor assembly also contains an anode termination to which anode leads of respective capacitor elements are electrically connected and a cathode termination to which the cathodes of respective capacitor elements are electrically connected. Referring again to FIG. 4, for example, the capacitor elements are shown connected in parallel to a common cathode termination 429. In this particular embodiment, the cathode termination 429 is initially provided in a plane that is generally parallel to the bottom surface of the capacitor elements and may be in electrical contact with conductive traces (not shown). The capacitor assembly 400 also includes connective members 427 and 527 that are connected to anode leads 407a and 407b, respectively, of the capacitor elements 420a and 420b. More particularly, the connective member 427 contains an upstanding portion 465 and a planar portion 463 that is in connection with an anode termination (not shown). Likewise, the connective 527 contains an upstanding portion 565 and a planar portion 563 that is in connection with an anode termination (not shown). Of course, it should be understood that a wide variety of other types of connection mechanisms may also be employed.

As a result of the present invention, the capacitor assembly may exhibit excellent electrical properties even when exposed to high temperature and high voltage environments. For example, the capacitor assembly may exhibit a relatively high "breakdown voltage" (voltage at which the capacitor fails), such as about 35 volts or more, in some embodiments about 50 volts or more, in some embodiments about 60 volts or more, and in some embodiments, from about 60 volts to about 100 volts, such as determined by increasing the applied voltage in increments of 3 volts until the leakage current reaches 1 mA. Likewise, the capacitor may also be able to withstand relatively high surge currents, which is also common in high voltage applications. The peak surge current may, for example, about 2 times the rated voltage or more, such as range from about 40 Amps or more, in some embodiments about 60 Amps or more, and in some embodiments, and in some embodiments, from about 120 Amps to about 250 Amps.

The capacitance may likewise be about 1 milliFarad per square centimeter ("mF/cm$^2$") or more, in some embodiments about 2 mF/cm$^2$ or more, in some embodiments from about 5 to about 50 mF/cm$^2$, and in some embodiments, from about 8 to about 20 mF/cm$^2$. The capacitance may be determined at an operating frequency of 120 Hz and a temperature of 25° C. In addition, the capacitor assembly can also exhibit a relatively high percentage of its wet capacitance, which enables it to have only a small capacitance loss and/or fluctuation in the presence of atmosphere humidity. This performance characteristic is quantified by the "dry to wet capacitance percentage", which is determined by the equation:

Dry to Wet Capacitance=(1−([Wet−Dry]/Wet))×100

The capacitor assembly of the present invention, for instance, may exhibit a dry to wet capacitance percentage of about 80% or more, in some embodiments about 85% or more, in some embodiments about 90% or more, and in some embodiments, from about 92% to 100%.

The capacitor assembly may also have an equivalence series resistance ("ESR") of less than about 50 ohms, in some embodiments less than about 25 ohms, in some embodiments from about 0.01 to about 10 ohms, and in some embodiments, from about 0.05 to about 5 ohms, measured at an operating frequency of 100 kHz. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 μA/μF*V, in some embodiments less than about 0.5 μA/μF*V, and in some embodiments, less than about 0.1 μA/μF*V, where μA is microamps and uF*V is the product of the capacitance and the rated voltage.

The electrical properties, such as described above, may even be maintained after aging for a substantial amount of time at high temperatures. For example, the values may be maintained for about 100 hours or more, in some embodiments from about 300 hours to about 3000 hours, and in some embodiments, from about 400 hours to about 2500 hours (e.g., 500 hours, 600 hours, 700 hours, 800 hours, 900 hours, 1000 hours, 1100 hours, 1200 hours, or 2000 hours) at temperatures ranging from about 100° C. to about 250° C., and, in some embodiments from about 100° C. to about 225° C., and in some embodiments, from about 100° C. to about 225° C. (e.g., 100° C., 125° C., 150° C., 175° C., or 200° C.).

The present invention may be better understood by reference to the following example.

Test Procedures

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency was 100 kHz and the temperature was 23° C.±2° C.

Capacitance

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.

Leakage Current

Leakage current ("DCL") was measured using a leakage test set that measures leakage current at a temperature of 25° C. and at the rated voltage after a minimum of 60 seconds.

Example

A tantalum anode (5.20 mm×3.70 mm×0.85 mm) was anodized at 125V in a liquid electrolyte to 10 μF. A conductive coating was then formed by dipping the entire anode into an aqueous solution of manganese(II) nitrate (1050 kg/m$^3$) for 150s and then decomposed at 250° C. This step was repeated two times. Next, the part was dipped into an aqueous solution of manganese(II) nitrate (1150 kg/m$^3$) for 150 seconds and then decomposed at 250° C. This step was repeated eight times. Thereafter, the part was dipped into an aqueous solution of manganese(II) nitrate (1300 kg/m$^3$) and then decomposed at 250° C. This step was repeated eight times. The part was then dipped into high specific gravity manganese(II) nitrate and the part was then coated with graphite and silver. A copper-based leadframe material was used to finish the assembly process. A single cathode connective member was attached to the lower surface of the capacitor element using a silver adhesive. The tantalum wire of the capacitor element was then laser welded to an anode connective member.

The anode and cathode connective members of the leadframe were then glued to a gold cathode termination and welded to a gold anode termination located inside a ceramic housing having a length of 11.00 mm, a width of 6.00 mm, and a thickness of 2.20 mm. The housing had gold plated solder pads on the bottom inside part of ceramic housing. The adhesive employed for the cathode connection was a tin solder paste (EPO-Tek E3035) and the adhesive was applied only between the leadframe portions and gold plated solder pad. After that, a Kovar® lid having a length of 9.95 mm, a width of 4.95 mm, and a thickness of 0.10 mm was placed over the top of the container, closely on the seal ring of the ceramic housing (Kovar® ring having a thickness of 0.30 mm) so that there was no direct contact between the interior surface of the lid and the exterior surface of the attached capacitor. The resulting assembly was placed into a welding chamber and purged with nitrogen gas for 120 minutes before seam welding between the seal ring and the lid was performed. No additional burn-in or healing was performed after the seam welding. Multiple parts (50) were made in this manner and then tested for electrical performance (i.e., leakage current, ESR, and capacitance after aging) by attaching the parts via solder paste to a PCB board. The measurements were conducted at 25° C. and then repeated after 500 hours of storage at a temperature of 200° C., 215° C., and 230° C. at an applied rated voltage of 0V. The results are set forth below.

| Conditions | DCL [μA] | ESR [mOhm] | Cap [μF] |
|---|---|---|---|
| At 25° C. | 0.21-0.26 | 131-136 | 9.6-9.9 |
| After 500 hours at 200° C. | 0.53 | 142 | 10.1 |
| After 500 hours at | 0.42 | 162 | 9.7 |

-continued

| Conditions | DCL [µA] | ESR [mOhm] | Cap [µF] |
|---|---|---|---|
| 215° C. After 500 hours at 230° C. | 0.63 | 197 | 9.8 |

As indicated, the capacitor assemblies were able to maintain relatively stable electrical performance, even under the extreme conditions of high temperature.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A capacitor assembly comprising: a capacitor element comprising a dielectric coated anode body formed from an anodically oxidized, sintered porous body, and a solid electrolyte coating the anode, wherein the solid electrolyte comprises a manganese oxide, wherein the manganese oxide penetrates into the dielectric coated anode body and coats at least a portion of the dielectric coated anode body in a film; a housing that defines an interior cavity within which the capacitor element is positioned, wherein the interior cavity has a gaseous atmosphere that contains an inert gas; an anode termination that is in electrical connection with the dielectric coated anode body; and a cathode termination that is in electrical connection with the solid electrolyte.

2. The capacitor assembly of claim 1, wherein the porous body is formed from tantalum or niobium oxide powder.

3. The capacitor assembly of claim 2, wherein the powder has a specific charge of less than about 70,000 µF*V/g.

4. The capacitor assembly of claim 1, wherein the capacitor element occupies about 30 vol. % or more of the interior cavity.

5. The capacitor assembly of claim 1, wherein inert gases constitute from about 50 wt. % to 100 wt. % of the gaseous atmosphere.

6. The capacitor assembly of claim 1, wherein the housing is formed from a metal, plastic, ceramic, or a combination thereof.

7. The capacitor assembly of claim 1, further comprising a lead that extends in a lateral direction from the porous body of the dielectric coated anode body, wherein the lead is positioned within the interior cavity of the housing.

8. The capacitor assembly of claim 7, further comprising a connective member that contains a first portion that is positioned generally perpendicular to the lateral direction of the anode lead and connected thereto.

9. The capacitor assembly of claim 8, wherein the connective member further contains a second portion that is generally parallel to the lateral direction in which the anode lead extends.

10. The capacitor assembly of claim 9, wherein the second portion is positioned within the housing.

11. A method of forming a capacitor assembly, the method comprising: positioning a capacitor element within an interior cavity of a housing, wherein the capacitor element comprises a dielectric coated anode body formed from an anodically oxidized, sintered anode body, coated with a solid electrolyte, wherein the solid electrolyte includes a manganese oxide, wherein the manganese oxide penetrates into the dielectric coated anode body and coats at least a portion of the dielectric coated anode body in a film; electrically connecting the dielectric coated anode body of the capacitor element to an anode termination and the solid electrolyte of the capacitor element to a cathode termination; and hermetically sealing the capacitor element within the housing in the presence of a gaseous atmosphere that contains an inert gas.

12. The method of claim 11, wherein the capacitor element is formed by contacting the dielectric-coated anode body with a manganese oxide precursor solution, and pyrolytically converting the precursor to a manganese oxide solid electrolyte.

13. The method of claim 12, wherein the manganese oxide precursor is manganese nitrate.

14. The method of claim 13, wherein the precursor solution contains a dispersant.

15. The method of claim 14, wherein the ratio of the surface tension of water (at 20° C.) to the surface tension of the dispersant (at a concentration of 1 wt. % in water and at 20° C.) is from about 0.5 to about 2.0.

16. The method of claim 12, wherein the solution is an aqueous solution.

17. The method of claim 12, wherein the precursor is pyrolytically converted to the oxide at a temperature of from about 150° C. to about 300° C.

* * * * *